United States Patent
Okada et al.

(10) Patent No.: US 7,086,787 B2
(45) Date of Patent: Aug. 8, 2006

(54) JOINTING HOLDER FOR OPTICAL MODULE FOR SINGLE-FIBER BIDIRECTIONAL COMMUNICATION AND OPTICAL MODULE INCORPORATING THE JOINTING HOLDER

(75) Inventors: Takeshi Okada, Osaka (JP); Yoshiki Kuhara, Osaka (JP); Hiromi Nakanishi, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 127 days.

(21) Appl. No.: 10/631,640

(22) Filed: Jul. 31, 2003

(65) Prior Publication Data

US 2005/0025497 A1    Feb. 3, 2005

(30) Foreign Application Priority Data

May 29, 2003   (JP) .............................. 2003-152950

(51) Int. Cl.
   *G02B 6/36*   (2006.01)
(52) U.S. Cl. .......................... 385/92; 385/93; 385/88; 398/139
(58) Field of Classification Search .................. 385/92
   See application file for complete search history.

(56) References Cited

U.S. PATENT DOCUMENTS

| | | | | |
|---|---|---|---|---|
| 5,127,075 A | * | 6/1992 | Althaus et al. | 385/94 |
| 5,347,605 A | * | 9/1994 | Isaksson | 385/92 |
| 5,408,559 A | * | 4/1995 | Takahashi et al. | 385/89 |
| 5,552,918 A | * | 9/1996 | Krug et al. | 398/139 |
| 5,621,573 A | * | 4/1997 | Lewis et al. | 359/634 |
| 5,663,821 A | * | 9/1997 | Suda et al. | 398/139 |
| 5,796,899 A | * | 8/1998 | Butrie et al. | 385/92 |
| 5,841,562 A | * | 11/1998 | Rangwala et al. | 398/139 |
| 5,867,622 A | * | 2/1999 | Miyasaka et al. | 385/88 |
| 6,040,934 A | * | 3/2000 | Ogusu et al. | 398/139 |
| 6,106,160 A | * | 8/2000 | Kikuchi et al. | 385/88 |
| 6,282,000 B1 | * | 8/2001 | Kikuchi et al. | 398/136 |
| 6,334,716 B1 | * | 1/2002 | Ojima et al. | 385/89 |
| 6,493,121 B1 | * | 12/2002 | Althaus | 398/135 |
| 6,854,897 B1 | * | 2/2005 | Furumai et al. | 385/73 |

FOREIGN PATENT DOCUMENTS

| | | |
|---|---|---|
| EP | 0 644 669 A1 | 3/1995 |
| JP | 03-209206 | 9/1991 |
| JP | 08-005862 | 1/1996 |
| JP | 08/005862 | 1/1996 |
| JP | 08/262276 | 10/1996 |
| JP | 08-262276 | 10/1996 |
| JP | 2003-101119 | 4/2003 |

* cited by examiner

*Primary Examiner*—Frank G. Font
*Assistant Examiner*—Ryan Lepisto
(74) *Attorney, Agent, or Firm*—Fish & Richardson P.C.

(57) ABSTRACT

A jointing holder for an optical module for single-fiber bidirectional communication comprises a unitarily structured cylindrical body that has the following portions: (a) an optical fiber-fixing portion for securely holding an optical fiber for transmitting multiwavelength light bidirectionally, (b) a semiconductor laser-fixing portion for securely holding a semiconductor laser for emitting outgoing light $\lambda 1$, (c) a photodiode-fixing portion for securely holding a photodiode for receiving incoming light $\lambda 2$, (d) an optical path-forming space for optically coupling the optical fiber, the semiconductor laser, and the photodiode, and (e) in the optical path-forming space, an optical filter-fixing face for securely holding an optical filter for separating multiplexed wavelengths. The jointing holder enables the optical module to reduce the number of components, to be miniaturized, and to reduce the dimensional deviation at the time of the assembly, enabling high-precision assembly. An optical module for single-fiber bidirectional communication incorporates the jointing holder.

1 Claim, 3 Drawing Sheets

JOINTING HOLDER FOR OPTICAL MODULE FOR SINGLE-FIBER BIDIRECTIONAL COMMUNICATION AND OPTICAL MODULE INCORPORATING THE JOINTING HOLDER

BACKGROUND OF THE INVENTION

1. Field of the Invention

The present invention relates to a jointing holder for an optical module for single-fiber bidirectional communication for securely holding an optical fiber for transmitting multiwavelength light bidirectionally, a semiconductor laser for emitting outgoing light, a photodiode for receiving incoming light, and an optical filter for separating multiplexed wavelengths. The present invention also relates to an optical module for single-fiber bidirectional communication incorporating the jointing holder.

2. Description of the Background Art

In the subscriber loop represented by the FTTH (fiber to the home) system in an optical fiber communications system, signal transmission and reception is mainly performed by a wavelength division multiplexing system using two wavelengths in a 1.3-μm band and a 1.55-μm band transmitted over a single optical fiber.

For such a wavelength division multiplexing system, European Patent EP 0 644 669 A1 and U.S. Pat. No. 5,841,562 have disclosed optical modules for single-fiber bidirectional communication. They are composed of an optical fiber for transmitting multiwavelength light bidirectionally, a semiconductor laser for emitting outgoing light, a photodiode for receiving incoming light, and an optical filter for separating multiplexed wavelengths. These components are securely held by an enclosure through individual fixing members.

Consequently, the conventional optical module for single-fiber bidirectional communication requires individual fixing members for fixing the components to the enclosure. This structure has the following drawbacks: (a) A large number of components make it difficult to miniaturize the module. (b) The positioning of the fixing members to the enclosure is difficult. (c) Dimensional deviation tends to occur at the time of the assembly. (d) An intention to increase the precision leads to a significant increase in the cost.

SUMMARY OF THE INVENTION

An object of the present invention is to offer a jointing holder for an optical module for single-fiber bidirectional communication in order to solve the foregoing problem. The jointing holder to be offered gives the following advantages to the optical module: (a) The optical module is composed of a small number of components so that it can be miniaturized. (b) It reduces the dimensional deviation at the time of the assembly, enabling high-precision assembly. Another object is to offer an optical module for single-fiber bidirectional communication incorporating the jointing holder.

According to the present invention, the foregoing object is attained by a jointing holder comprising a unitarily structured cylindrical body that has the following portions:

(a) an optical fiber-fixing portion for securely holding an optical fiber for transmitting multiwavelength light bidirectionally;

(b) a semiconductor laser-fixing portion for securely holding a semiconductor laser for emitting outgoing light;

(c) a photodiode-fixing portion for securely holding a photodiode for receiving incoming light;

(d) an optical path-forming space for optically coupling the optical fiber, the semiconductor laser, and the photodiode; and (e) in the optical path-forming space, an optical filter-fixing face for securely holding an optical filter for separating multiplexed wavelengths.

The foregoing unitarily structured cylindrical body can eliminate other fixing members than the cylindrical body itself. It also enables precision machining, by using a machining tool such as a lathe, of the position of the fixing portions for individual components of the optical module. As a result, the jointing holder gives the following advantages to the optical module: (a) The optical module can reduce the number of components. (b) It can reduce the cost. (c) It can be miniaturized. (d) The simple operation for adjusting the optical axes of the optical components can reduce the dimensional deviation at the time of the assembly, enabling high-precision assembly.

The jointing holder may have a structure in which the optical filter-fixing face slants against the optical axis of the optical fiber. The jointing holder may have a structure in which the optical fiber-fixing portion and the semiconductor laser-fixing portion are aligned with each other, and the photodiode-fixing portion is placed in a direction perpendicular to the optical axis of the optical fiber-fixing portion. Conversely, the jointing holder may have a structure in which the optical fiber-fixing portion and the photodiode-fixing portion are aligned with each other, and the semiconductor laser-fixing portion is placed in a direction perpendicular to the optical axis of the optical fiber-fixing portion.

The jointing holder may have a structure in which the semiconductor laser-fixing portion has a cylindrical face coaxial with the optical axis of the optical fiber, and the photodiode-fixing portion has a flat face parallel to the axis of the cylindrical face. The jointing holder may have a structure in which:

(a) the optical path-forming space has an optical path-forming hole for optically coupling the optical fiber and the semiconductor laser;

(b) a slanting groove that slants against the optical axis of the optical fiber is formed between the flat face of the photodiode-fixing portion and the optical path-forming hole; and (c) the bottom face of the slanting groove is used as the optical filter-fixing face.

In accordance with one aspect of the present invention, an optical module for single-fiber bidirectional communication comprises:

(a) a jointing holder in accordance with the present invention;

(b) an optical fiber fixed at the optical fiber-fixing portion;

(c) a semiconductor laser fixed at the semiconductor laser-fixing portion;

(d) a photodiode fixed at the photodiode-fixing portion; and (e) an optical filter for separating multiplexed wavelengths fixed at the optical filter-fixing face.

DETAILED DESCRIPTION OF THE INVENTION

Embodiments of the present invention are explained below by referring to the accompanying drawings. To avoid duplicated explanations, the same signs are allocated to the same members throughout the drawings.

Figure 1:
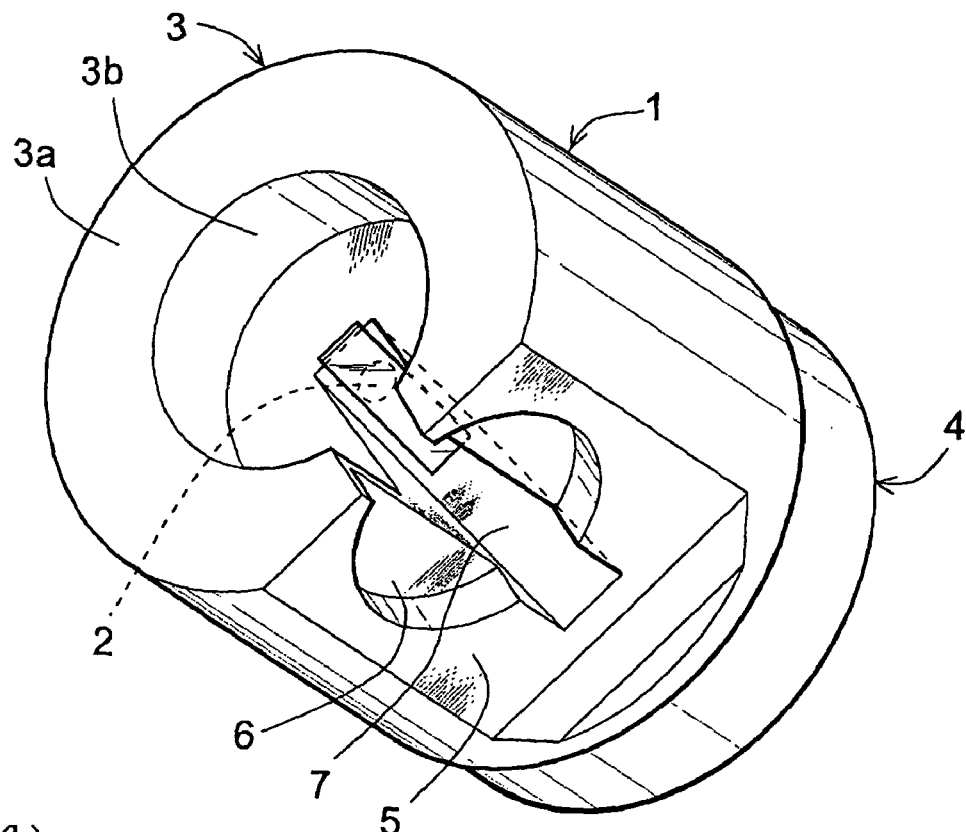
FIG. 1(a) is a perspective view of the first embodiment of the jointing holder for an optical module for single-fiber bidirectional communication in accordance with the present invention.
FIG. 1(b) is a longitudinal cross section of the jointing holder.
Figure 1:
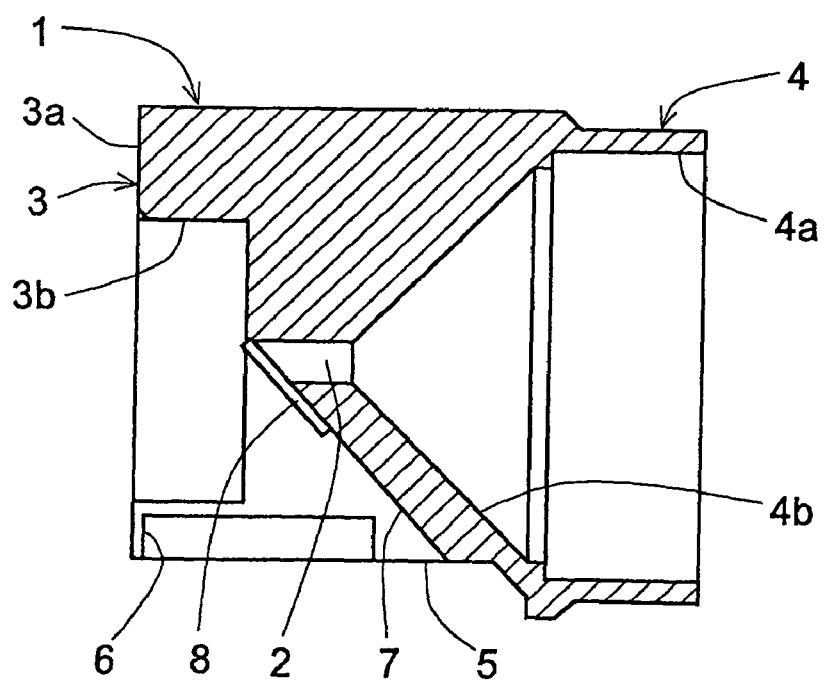

FIGS. 1(a) and 1(b) show the first embodiment of the jointing holder of the present invention. The jointing holder comprises a cylindrical body 1 having a basically cylindrical form produced by machining a material made of stainless steel with a lathe. The cylindrical body 1 has an optical path-forming hole 2 at the axis of the cylindrical form. The cylindrical body 1 has an optical fiber-fixing portion 3 at one end and a semiconductor laser-fixing portion 4 at the other end. The optical fiber-fixing portion 3 has a ferrule holder-fixing face 3a perpendicular to the axis of the cylindrical form and an optical fiber ferrule-storing hole 3b.

Figure 2:
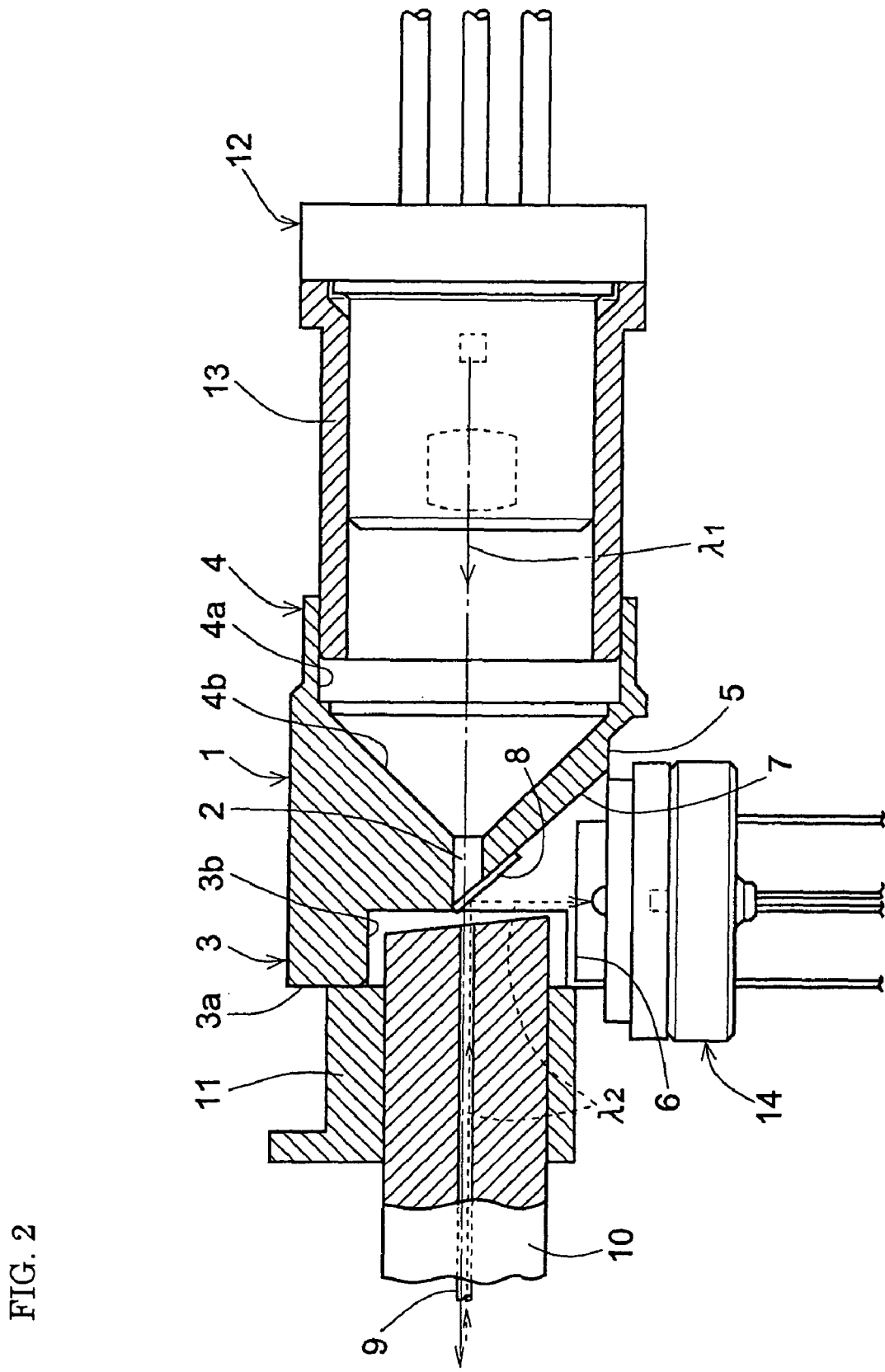
FIG. 2 is a longitudinal cross section of an optical module for single-fiber bidirectional communication assembled by using the jointing holder shown in FIGS. 1(a) and 1(b).

FIG. 2 is a longitudinal cross section of an optical module for single-fiber bidirectional communication assembled by using the jointing holder shown in FIGS. 1(a) and 1(b). As shown in FIGS. 1(b) and 2, the semiconductor laser-fixing portion 4 has a fixing hole 4a into which a sleeve 13 of a semiconductor laser 12 is inserted. The fixing hole 4a has an inner circular face with a dimension providing a good fitting with the outer circular face of the sleeve 13. A conical face 4b is formed from the inner end of the fixing hole 4a to the optical path-forming hole 2. Although the conical face 4b shown in FIGS. 1(b) and 2 has a steplessly narrowing face, the face may be narrowed in a stepwise manner.

The ferrule-storing hole 3b of the optical fiber-fixing portion 3 and the fixing hole 4a of the semiconductor laser-fixing portion 4 are precisely machined with a lathe such that their axes are aligned with the axis of the optical path-forming hole 2.

On the outer circular face of the cylindrical body 1, a flat face parallel to the axis of the cylindrical body 1 is formed by cutting the outer circular face. The flat face is used as a photodiode-fixing portion 5, which has a recessed portion 6 into which the lens of the photodiode 14 is fitted. A slanting groove is formed from the flat face to the optical path-forming hole 2 with an angle of about 45 degrees. The slanting bottom face of the groove is used as an optical filter-fixing face 7 to which an optical filter 8 is attached.

The optical module for single-fiber bidirectional communication is assembled by the following process.

First, the optical filter 8 is attached with an adhesive to the optical filter-fixing face 7. In this case, the optical filter 8 has a property such that it transmits the outgoing light λ1 in a 1.3-μm band emitted from the semiconductor laser 12 and reflects the incoming light λ2 in a 1.55-μm band entered through the optical fiber 9, for example.

The optical filter 8 can be produced by forming a multilayer film on a glass substrate having a thickness of about 100 μm by vapor deposition or chemical vapor deposition. The multilayer film can be made of MgF, $SiO_2$, $Si_3N_4$, or $TiO_2$. Because the multilayer optical filter 8 can be attached directly to the slanting optical filter-fixing face 7, its angle against the optical axis of the optical fiber 9 can be precisely maintained. When the multilayer film of the optical filter 8 is formed on an polyimide film having a thickness of 10 to 50 μm or so, the reinforcing transparent glass substrate can be eliminated to reduce the cost.

The optical fiber 9 can be terminated either as a pigtail type or as a receptacle type. Each of them comprises an optical fiber ferrule 10 and a ferrule holder 11. In either type, the end face is obliquely cut.

The semiconductor laser 12 is fixed to the cylindrical body 1 such that the outgoing light λ1 has a specified intensity. To attain this condition, the optical axis is aligned by turning and axially moving the sleeve 13 of the semiconductor laser 12 in the fixing hole 4a of the semiconductor laser-fixing portion 4. After this alignment, the sleeve 13 is welded to the fixing hole 4a. Subsequently, the optical fiber 9 is fixed to the cylindrical body 1 by the following process: (a) The end portion of the optical fiber ferrule 10 is inserted into the ferrule-storing hole 3b of the optical fiber-fixing portion 3. (b) The ferrule holder 11 is aligned on the ferrule holder-fixing face 3a to be welded to it.

Next, the photodiode 14 is fixed to the cylindrical body 1 such that the incoming light λ2 entered through the optical fiber 9 is received with a maximized sensitivity. To attain this condition, the optical axis of the photodiode 14 is adjusted by moving the photodiode 14 on the flat face of the photodiode-fixing portion 5. After this adjustment, the holder of the photodiode 14 is welded to the flat face of the photodiode-fixing portion 5. This concludes the assembly of the optical module for single-fiber bidirectional communication.

Figure 3:
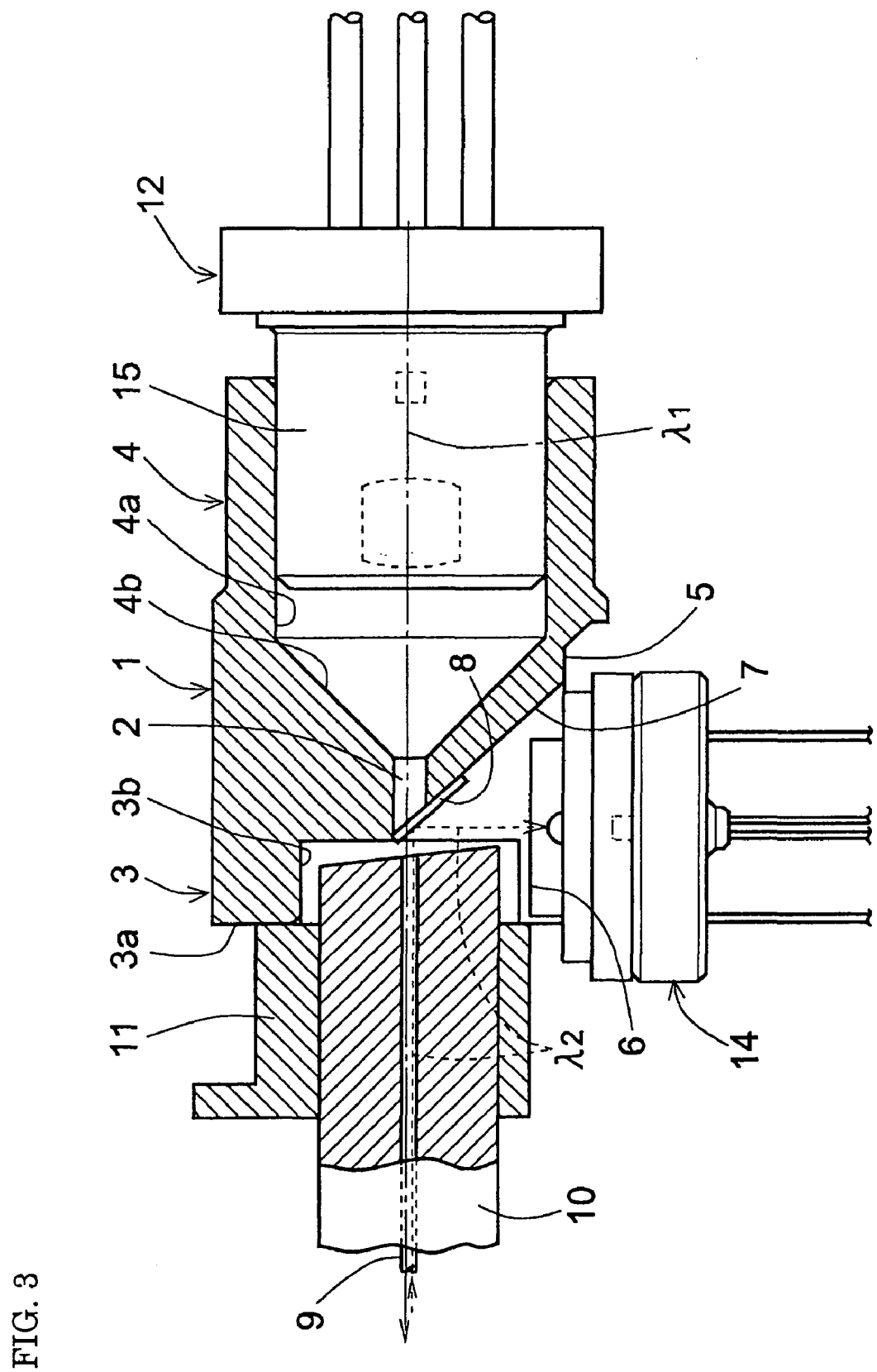
FIG. 3 is a longitudinal cross section of an optical module for single-fiber bidirectional communication assembled by using the jointing holder for the second embodiment.

FIG. 3 shows the second embodiment of the present invention. In this embodiment, a lens-holding cap 15 for the semiconductor laser 12 is fitted directly into the fixing hole 4a of the semiconductor laser-fixing portion 4. In other words, the sleeve 13 of the semiconductor laser 12 used in the first embodiment is eliminated. The other structure is the same as in the first embodiment.

As described above, in the first and second embodiments, the optical fiber-fixing portion 3 and the semiconductor laser-fixing portion 4 are aligned with each other, and the photodiode-fixing portion 5 is placed in a direction perpendicular to the optical axis of the optical fiber-fixing portion. However, this arrangement may be modified such that the optical fiber-fixing portion 3 and the photodiode-fixing portion 5 are aligned with each other, and the semiconductor laser-fixing portion 4 is placed in a direction perpendicular to the optical axis of the optical fiber-fixing portion. In this case also, the semiconductor laser-fixing portion 4 is cylindrically formed to enable the axial and circular movements of the semiconductor laser 12, and the photodiode-fixing portion 5 is formed in a flat face to enable the movement of the photodiode 14 on the flat face.

What is claimed is:

1. A method of producing a jointing holder for an optical module for single-fiber bidirectional communication, the method comprising:
    providing a unitary structure comprising:
        an optical fiber-fixing portion for securely holding an optical fiber for transmitting multiwavelength light bidirectionally;
        a semiconductor laser-fixing portion for securely holding a semiconductor laser for emitting outgoing light;
        a photodiode-fixing portion for securely holding a photodiode for receiving incoming light;

an optical path-forming space for optically coupling the optical fiber, the semiconductor laser and the photodiode; and in the optical path-forming space, an optical filter-fixing face for securely holding an optical filter for separating multiplexed wavelengths;

wherein the optical filter-fixing face is slanted against the optical axis of the optical fiber;

arranging the optical axis of the optical fiber and semiconductor laser to be aligned with each other, and arranging the photodiode to be perpendicular to the optical axis of the optical fiber, wherein the semiconductor laser-fixing portion comprises an inner face of a cylinder coaxial with the optical axis of the optical fiber, and the photodiode-fixing portion is adapted such that the photodiode is fixable at a place where the photodiode can receive light from the optical fiber wherein the light is bent at an angle of nearly 90° by the optical filter;

providing the optical path-forming space with an optical path-forming hole for optically coupling the optical fiber and the semiconductor laser;

forming a slanting groove that slants against the optical axis of the optical fiber by cutting between the photodiode-fixing portion and the optical path-forming hole such that the bottom face of the slanting groove is used as the optical filter-fixing face, and the optical path is secured.

* * * * *